United States Patent
Liu

(10) Patent No.: US 8,279,496 B2
(45) Date of Patent: *Oct. 2, 2012

(54) METHOD OF OPTIMAL FOCUSING FOR DOCUMENT SCANNER

(75) Inventor: Rong-Ji Liu, Taichung (TW)

(73) Assignee: Transpacific Systems, LLC, Wilmington, DE (US)

( * ) Notice: Subject to any disclaimer, the term of this patent is extended or adjusted under 35 U.S.C. 154(b) by 1799 days.

This patent is subject to a terminal disclaimer.

(21) Appl. No.: 11/513,836

(22) Filed: Aug. 30, 2006

(65) Prior Publication Data

US 2009/0015880 A1 Jan. 15, 2009

Related U.S. Application Data

(63) Continuation of application No. 10/237,957, filed on Sep. 10, 2002, now Pat. No. 7,215,447.

(51) Int. Cl.
*H04N 1/04* (2006.01)

(52) U.S. Cl. ........ 358/474; 358/475; 358/497; 358/444; 358/483; 358/486; 399/211; 399/210

(58) Field of Classification Search .................. 358/474, 358/475, 497, 494, 496, 498, 486, 488, 482, 358/483, 487, 406, 509, 505, 504, 506, 512–514, 358/444; 399/211, 210; 250/208.1, 234–236, 250/216; 382/312, 318, 319

See application file for complete search history.

(56) References Cited

U.S. PATENT DOCUMENTS

| 4,586,808 | A | * | 5/1986 | Tanimoto et al. ............. 399/200 |
| 5,075,539 | A | * | 12/1991 | Shiraishi .................... 250/208.1 |
| 5,157,518 | A |   | 10/1992 | Ohtaki et al. |
| 5,177,621 | A | * | 1/1993 | Ohtaki et al. ................. 358/406 |
| 5,446,276 | A |   | 8/1995 | Iyoda et al. |
| 6,157,468 | A |   | 12/2000 | Tsai et al. |
| 6,301,061 | B1 |  | 10/2001 | Lin |
| 6,493,075 | B1 |  | 12/2002 | Huang et al. |
| 6,512,602 | B1 |  | 1/2003 | Sheng et al. |
| 6,587,227 | B1 |  | 7/2003 | Fullerton |
| 6,603,580 | B1 |  | 8/2003 | Taillie |
| 7,215,447 | B2 | * | 5/2007 | Liu ............................... 358/474 |

* cited by examiner

*Primary Examiner* — Cheukfan Lee
(74) *Attorney, Agent, or Firm* — Stolowitz Ford Cowger LLP

(57) ABSTRACT

A method of optimal focusing for a document scanner is disclosed. The scanner includes an optic module movable in a given scanning direction to perform scanning operation over an area of a document in a scan line by scan line manner by being driven by an optic module moving mechanism under control of a control unit. The control unit includes a best focus value memory for storage of the best focus value for each scan line. The method includes the steps of moving the optic module to one of scan lines of the document and retrieving the best focus value corresponding to the selected scan line. A focus adjusting mechanism is controlled by the control unit to move the optic module in a second direction to adjust the focus position of the optic module in accordance with the best focus value of the scan line. Once the optic module reaches the scan line, the operation of the optic module is temporarily suspended in order to have the vibration of the optic module damped out. Thereafter, a scanning operation is performed over the scan line.

31 Claims, 4 Drawing Sheets

METHOD OF OPTIMAL FOCUSING FOR DOCUMENT SCANNER

RELATED APPLICATION

The present application is a Continuation of U.S. patent application Ser. No. 10/237,957, now U.S. Pat. No. 7,215,447, filed on Sep. 10, 2002, by Liu, titled "Method of Optimal Focusing for Document Scanner," assigned to the Assignee of the present application, and incorporated by reference in its entirety herein.

BACKGROUND OF THE INVENTION

1. Field of the Invention

The present invention relates generally to a document scanner, and in particular to a method of optimal focusing for a document scanner for obtaining best image of scanning.

2. The Related Art

Document scanners have been widely used to digitalize graphic information from reflective and transmissive original documents. A major factor concerning the performance of the document scanners is the resolution, the fineness of the digitalization of a document. Excellent digitalization of documents can be obtained by upgrading resolution of scanner. However, proper focusing is another factor for the excellent digitalization of a document.

FIG. 1 of the attached drawings shows a conventional document scanner, comprising a casing 2 having a scanning window formed by a rectangular opening to which a light-transmitting document support plate 11 is attached for supporting a document 12 to be scanned in a face down manner. An optic module 2 is movably mounted inside the casing 1 below the document support plate 11. The optic module 2 is driven by an optic module moving mechanism 3 under the control of a control unit 4 for movement in a direction, indicated by arrow I, substantially parallel to the document support plate 11 in order to scan throughout the whole area of the document 12.

The optic module 2 comprises a light source 21 for emitting and projecting a light beam toward the document 12 to be scanned. The document 12 reflects the light as indicated by reference numeral 211. The reflected light 211 is redirected by a plurality of reflectors 22, 23, 24, 25 toward a focusing lens 26 and forms an image of the document on an image sensing device 27, such as charge coupled device (CCD).

Conventionally, the optic module 2 is calibrated to obtain the best focus for properly forming image on the image sensing device 27. However, the optic module 2 may gradually get out of calibration due to aging and environmental factors, such as exposure to shock and vibration.

Automatic focusing techniques are also employed in the document scanners for obtaining clear images. However, such automatic focusing techniques cannot overcome improper focusing caused by vibration of the scanner itself and worn parts.

In addition, conventionally, in a calibrated system, a document to be scanned is supposed to be on the nominal focal plane of the scanner. It is, however, often that the document is partially out of the nominal focal plane when the document is folded or when the document is not properly positioned on the document support plate. This leads to a partially unclear image of the document.

Thus, it is desired to have a method of automatic focusing for a document scanner in order to obtain clear image of the scanned document.

SUMMARY OF THE INVENTION

An object of the present invention is to provide a method of optimal focusing for a document scanner that overcomes improper focusing caused by vibration of the scanner itself and worn parts of the scanner.

Another object of the present invention is to provide a method of automatic focusing for a document scanner. The optic module of the document scanner is adjusted by a focus adjusting mechanism under control of a control unit, so that the optic module scans the document at a best focus position.

To achieve the above objects, in accordance with the present invention, there is provided a method of optimal focusing for a scanner wherein the scanner comprises an optic module movable in a given scanning direction to perform scanning operation over an area of a document in a scan line by scan line manner by being driven by an optic module moving mechanism under the control of a control unit. The control unit comprises a best focus value memory for storage of the best focus value for each scan line. The method includes the steps of moving the optic module to one of scan lines of the document and retrieving the best focus value corresponding to the scan line. An focus adjusting mechanism is controlled by the control unit to move the optic module in a direction substantially perpendicular to the scanning direction to adjust the focus position of the optic module in accordance with the best focus value of the scan line. Once the optic module reaches the scan line, the operation of the optic module is temporarily suspended in order to have the vibration of the optic module damped out. Thereafter, a scanning operation is performed over the scan line. If there is more scan lines to be scanned, the optic module is moved to the next scan line for scanning and the process is repeated until all scan lines are done.

BRIEF DESCRIPTION OF THE DRAWINGS

The present invention will be apparent to those skilled in the art by reading the following description of the best mode for carrying out the invention, with reference to the attached drawings, in which.

DETAILED DESCRIPTION OF THE PREFERRED EMBODIMENTS

Figure 1:
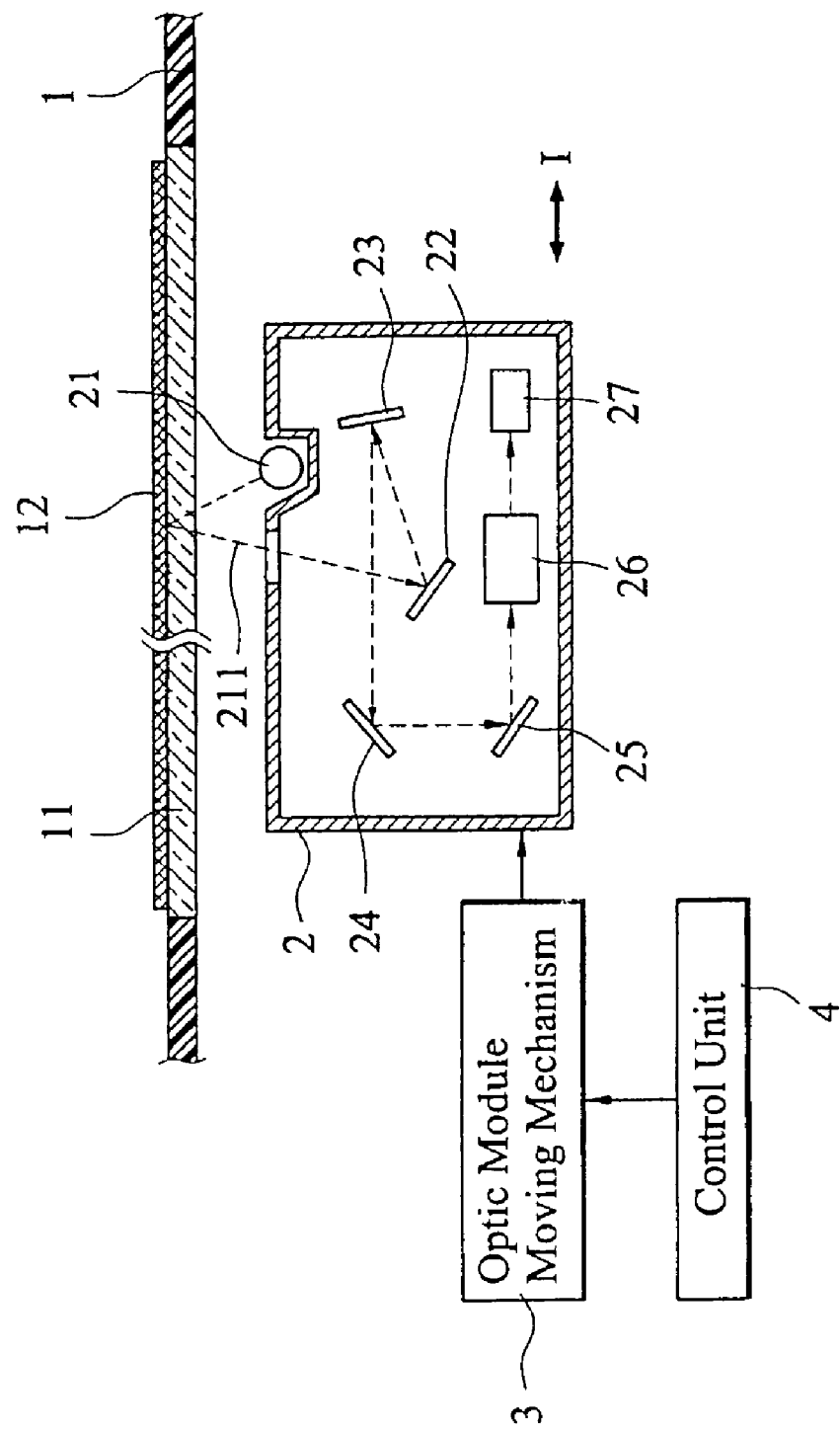
FIG. 1 is a schematic view of a conventional document scanner.
Figure 2:
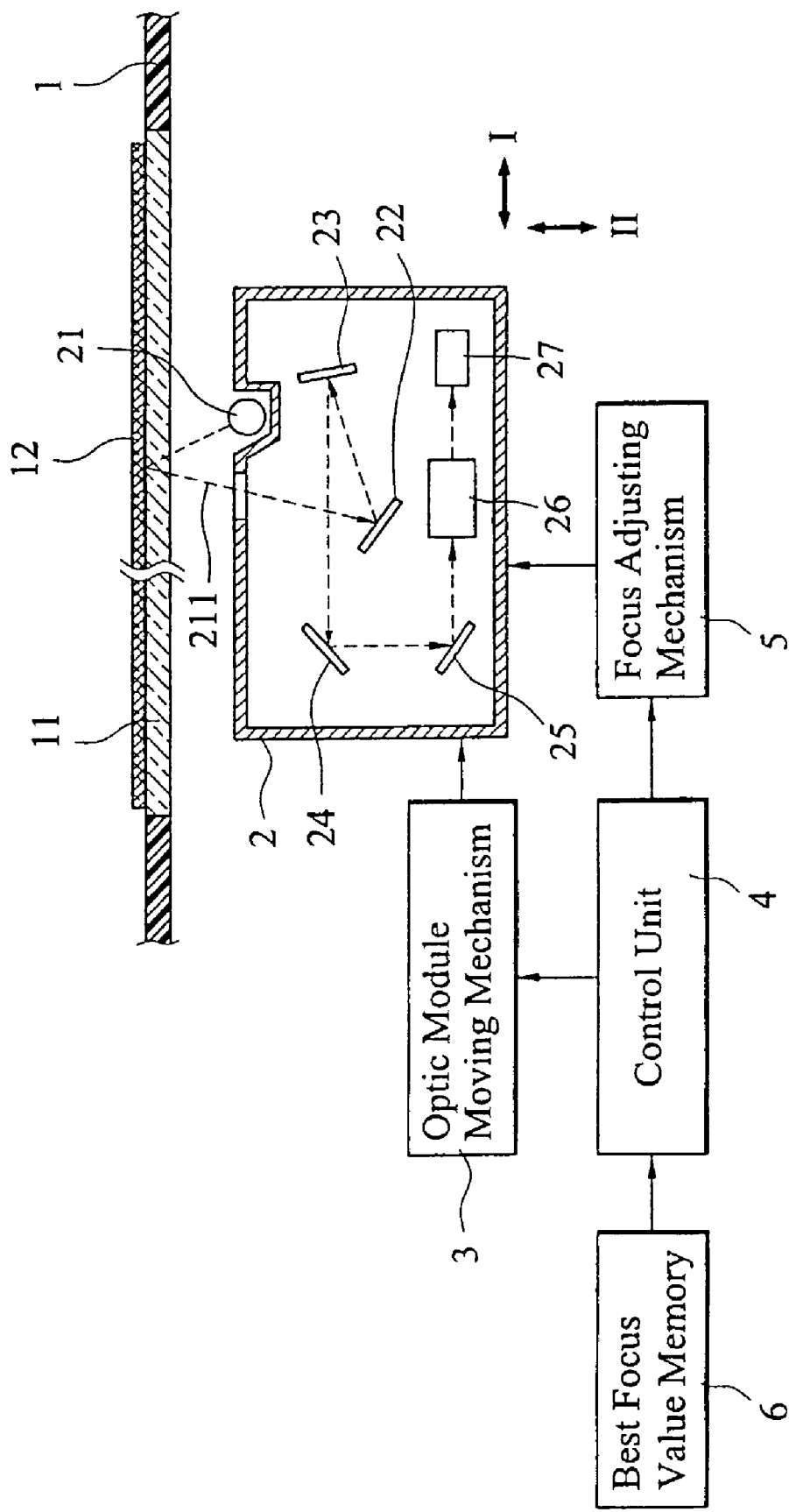
FIG. 2 is a schematic view of a document scanner constructed in accordance with the present invention.

With reference to the drawings and in particular to FIG. 2, a document scanner constructed in accordance with the present invention comprising a casing 1 having a light-transmitting document support plate 11 on which a document 12 to be scanned is positioned in a face down manner. A movable optic module 2 is arranged inside the casing 1 and below the document support plate 11. The optic module 2 comprises a light source 21 projecting a light beam toward the document 12. The document 12 reflects the light beam as a reflected light indicated by reference numeral 211 traveling into the optic module 2. The reflected light 211 is redirected by a plurality of reflective mirrors 22, 23, 24, 25 arranged in the optic module 2 toward a focusing lens 26 for forming an image on an image detector or an image sensing device 27, such as a Charge Coupled Device (CCD).

The optic module 2 is driven by an optic module moving mechanism 3 under the control of a control unit 4 to move, in a first scanning direction indicated by arrow I that is substantially parallel to the document support plate 11 of the scanner, with respect to the document 12 in a step by step manner in order to scan an area of the document 12 in a scan line by scan line manner.

In accordance with the present invention, the scanner further comprises a focus adjusting mechanism 5 which operates under the control of the control unit 4 to move the optic module 2 (or alternatively the focusing lens 26 and the image sensing device 27) with respect to the document support plate 11 in a second direction, indicated by arrow II that is substantially perpendicular to the document support plate 11, for adjustment of the focus position of the optic module 2.

The control unit 4 comprises a best focus value memory 6 for storage of at least one set of best focus value of each scan line or that of scan lines of every given number. This will be further discussed.

Figure 3:
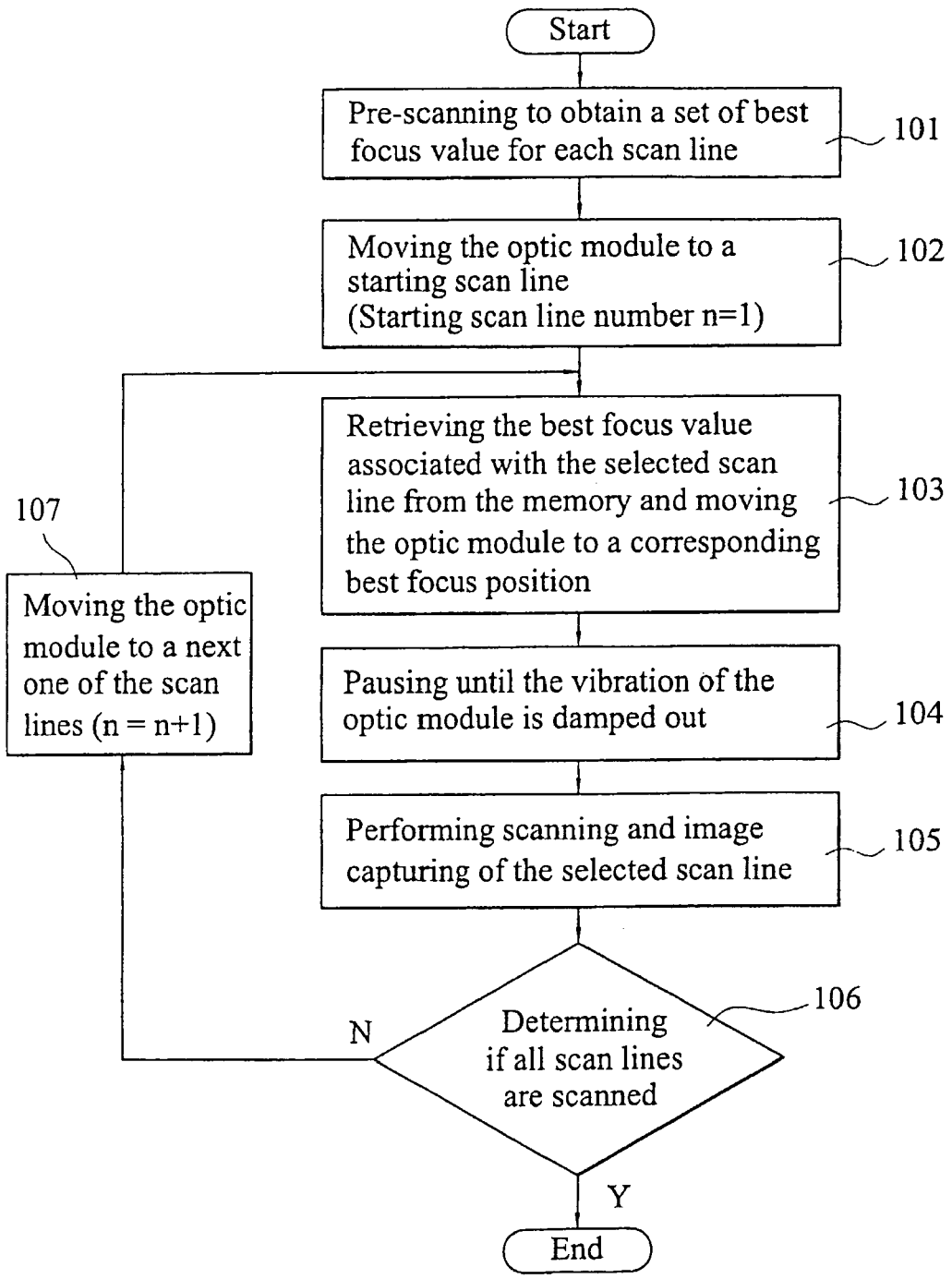
FIG. 3 is a flow chart of a method of automatic focusing for the document scanner of the present invention.

FIG. 3 shows a flow chart of a method of automatic focusing in accordance with the present invention. A pre-scanning (step 101) is taken first before a document is actually scanned. The pre-scanning process allows the scanner to obtain the best focus value of each scan line and such best focus value is stored in the best focus value memory 6. An illustrative way of performing the pre-scanning is done by means of a test sheet (not shown) generally comprised of alternating black and white patterns or segments. Thus the best focus value of each scan line with respect to the test sheet is obtained and stored in the best focus value memory 6.

Figure 4:
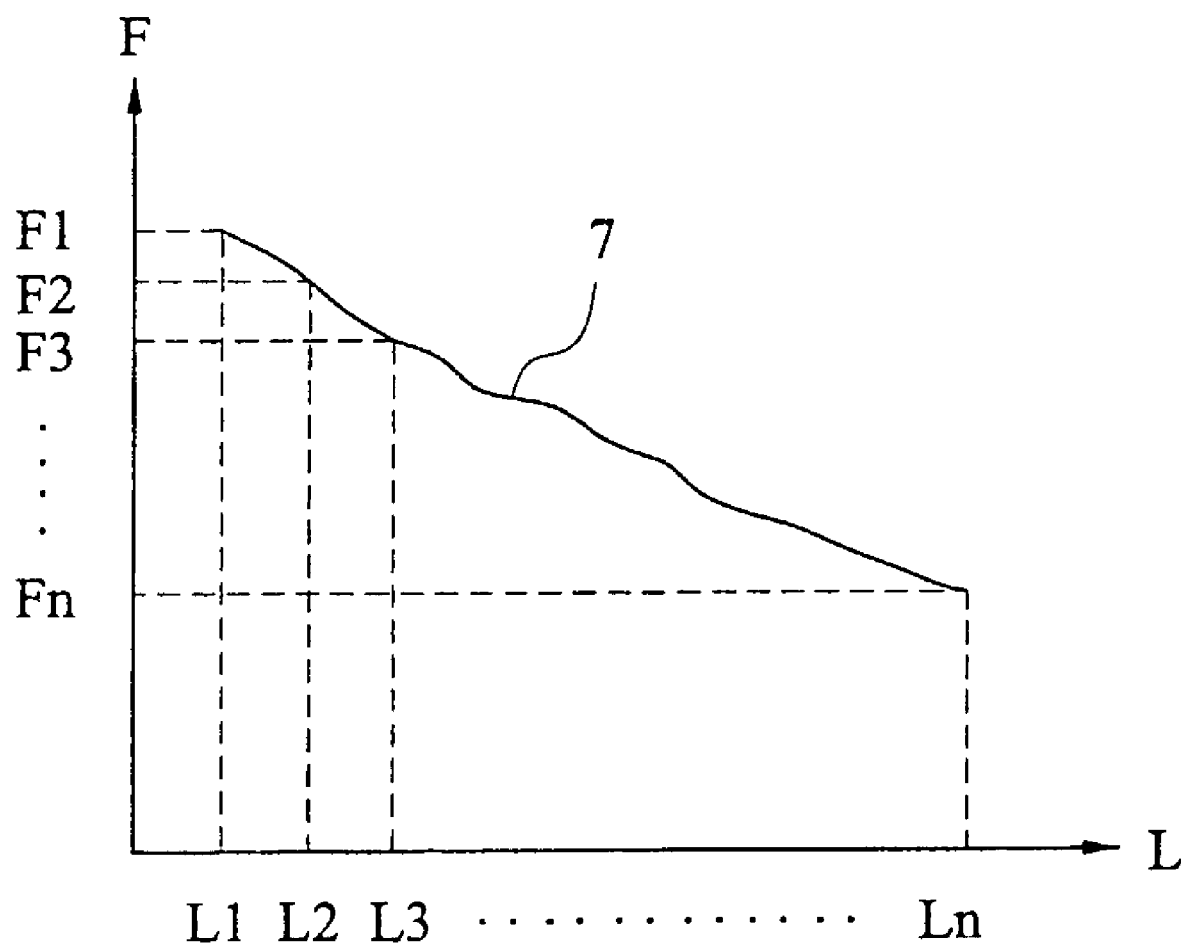
FIG. 4 is a plot showing the relationship between best focus value and scan line in accordance with the present invention.

FIG. 4 is a plot showing the relationship between best focus value and scan line obtained in step 101 of the present invention, wherein the abscissa represents the scan line number (L1, L2, L3, . . . , Ln) and the ordinate is the best focus value (F1, F2, F3, . . . , Fn) associated with the scan lines (L1, L2, L3, . . . , Ln). A best focus curve 7 can thus be obtained by connecting the points of the best focus value with respect to the scan lines. The curve 7 is stored in the best focus value memory 6 to be accessed by the control unit 4. There may be more than one set of best focus data stored in the best focus value memory 6.

In scanning a document 12 that is positioned on the document support plate 11, the optic module moving mechanism 3 drives the optic module 2 in the first direction I to a desired one of the scan lines, such as the starting scan line of the document 12 (step 102). In this case, the count number n of scan line Ln is set to 1, i.e. the starting scan line L1. In step 103, the control unit 4 retrieves the best focus value associated with the scan line to be scanned from the best focus value memory 6 and actuates the focus adjusting mechanism 5 to move the optic module 2 in the second direction II to a best focus position in accordance with the best focus value.

The movement of the optic module 2 to the scan line may cause the optic module 2 to vibrate. The optic module moving mechanism 3 thus pauses for a while until the vibration of the optic module 2 is damped out (step 104). In step 104, the operation of the optic module 2 is temporarily suspended for a predetermined time period t until the vibration thereof is damped out. The time period t can be determined in accordance with the design of the scanner or an experimental measurement of the time required for the vibration to damped down to a predetermined level. The optic module 2 then performs scanning and image capturing of the selected scan line (step 105).

After the scanning of the starting scan line is done, the scanner determines if all scan lines are scanned (step 106) and if there is any scan line that is not scanned, then the optic module 2 is moved to a next one of the scan lines and the count number n is increased by 1, namely n is set to n+1 (step 107). In this case, n is equal to two and the optic module 2 is moved to the second scan line L2 and the steps 103 to 106 are repeated. The steps 102 to 106 are repeatedly continued until the scanner determines that all scan lines are done.

In the example given above, the counter n is increased by one. It is apparent to those having ordinary skills to increment n by two or any integral number. This may shorten the overall scanning time but gives a poorer resolution.

The focusing adjusting process of the present invention features a temporary suspension of the optic module 2 until the vibration of the optic module 2 is damped out. This eliminates poor imaging caused by the vibration of the optic module 2 induced by the movement thereof. The process of the present invention also features adjustment of the focus position of the optic module 2 by moving the optic module 2 in a direction substantially normal to the scanning direction of the optic module 2. This allows for precise focusing of the optic module 2 with respect to the image sensing device 27. An enhanced imaging quality can be obtained.

Although the present invention has been described with reference to the best mode of operation thereof, it is apparent to those skilled in the art that a variety of modifications and changes may be made without departing from the scope of the present invention which is intended to be defined by the appended claims.

What is claimed is:

1. A scanner comprising:
an image detector;
a control unit coupled to said image detector;
a focus adjusting mechanism coupled to said control unit, wherein said focus adjusting mechanism is configured to operate under control of said control unit, and wherein said focus adjusting mechanism is further configured to adjust substantially in accordance with a focus value corresponding to a scan line position; and
an optical module coupled to said control unit, wherein said optical module is configured to move in a first direction relative to said scan line position, wherein said first direction is substantially parallel to a scanning window, wherein said optical module is configured to scan a line, and wherein said optical module is further configured to suspend movement at least until a vibration of said optical module is substantially damped out.

2. The scanner of claim 1, wherein said focus adjusting mechanism is further configured to move said optical module in a second direction substantially perpendicular to said scanning window.

3. The scanner of claim 1, wherein said optical module further comprises a lens.

4. The scanner of claim 3, wherein said focus adjusting mechanism is further configured to move said lens or said image detector.

5. The scanner of claim 1, wherein said control unit is coupled directly or indirectly to said image detector.

6. The scanner of claim 1, further comprising:
a memory unit coupled to said control unit.

7. The scanner of claim 1, wherein said image detector comprises a charge coupled device.

8. The scanner of claim 1, wherein said optical module is further configured to move in said first direction with respect to a subsequent scan line position.

9. The scanner of claim 8, wherein said optical module is further configured to scan at least substantially all scan lines.

10. The scanner of claim 8, wherein said optical module is further configured to shorten scanning time.

11. The scanner of claim 1, wherein said control unit is configured to perform a pre-scanning operation to at least in part establish a focus value for said scan line position.

12. The scanner of claim 11, wherein said control unit is further configured to associate said scan line position with said focus value.

13. The scanner of claim 12, wherein said control unit is further configured to utilize a focus curve obtained by connecting a plurality of points representing one or more focus values.

14. The scanner of claim 12, wherein said control unit is further configured to utilize a focus curve derived from a plurality of points representing one or more focus values.

15. The scanner of claim 1, wherein said optical module is further configured to obtain a focus value for said scan line position by scanning a test sheet.

16. The scanner of claim 15, wherein said test sheet comprises a black-and-white pattern or segment.

17. The scanner of claim 1, wherein said movement is suspended for a time period.

18. A component of a scanner comprising:
    an optical module configured to perform a scanning operation of a scan line;
    a focus adjusting mechanism configured to adjust substantially in accordance with a focus value corresponding to a position of said scan line, wherein said focus adjusting mechanism is further configured to suspend said scanning operation until a vibration associated with said optical module is at least substantially damped out.

19. The component of claim 18, wherein said focus value is determined based on a pre-scanning operation performed by said optical module.

20. The component of claim 18, wherein said focus adjusting mechanism is further configured to move a lens or an image detector located in the optical module.

21. A method comprising:
    identifying a scan line position of a scanner;
    retrieving a focus value corresponding to said scan line position;
    adjusting a focus adjustment mechanism of said scanner substantially in accordance with said focus value; and
    suspending a scanning operation of said optical module at least until a vibration of said optical module is substantially damped out.

22. The method of claim 21, wherein said adjusting comprises:
    moving an optical module in a direction substantially perpendicular to a scanning window, wherein said optical module is moved to a focus position corresponding to said focus value.

23. The method of claim 21, wherein said focus value is determined based on a pre-scanning operation performed by said scanner.

24. A method comprising:
    moving an optical module in a first direction substantially parallel to a scanning window of a scanner;
    identifying a focus value corresponding to a scan line position of said optical module; and
    adjusting said optical module in accordance with said focus value, wherein said scanner is configured to suspend movement of said optical module until a vibration associated with said optical module is substantially damped out.

25. The method of claim 24, wherein said adjusting comprises:
    moving said optical module in a second direction substantially perpendicular to said scanning window.

26. The method of claim 24, wherein said adjusting comprises:
    moving a lens or an image sensing device.

27. The method of claim 24, wherein said method further comprises:
    for at least one scan line, moving said optical module without adjusting said optical module.

28. The method of claim 24, wherein said focus value is predetermined based on a pre-scanning operation performed by said optical module.

29. A system for scanning, comprising:
    means for identifying a focus value corresponding to a scan line position of an optical module;
    means for adjusting a focus adjustment mechanism of a scanner substantially in accordance with said focus value; and
    means for suspending an operation of said scanner at least until a vibration associated with said optical module is substantially damped out.

30. The system of claim 29, wherein said means for adjusting comprises:
    means for moving said optical module in a direction substantially perpendicular to a scanning window.

31. The system of claim 29, wherein said focus value is determined based on a pre-scanning operation performed by said scanner.

* * * * *